Patented Oct. 10, 1950

2,525,416

UNITED STATES PATENT OFFICE 2,525,416

PREPARATION OF DITHIOOXALODIAMIDES AND THIOACETAMIDES

Charles L. Levesque, Philadelphia, Pa., assignor to Rohm & Haas Company, Philadelphia, Pa., a corporation of Delaware No Drawing. Application June 17, 1948, Serial No. 33,680

5 Claims. (Cl. 260—247.1)

This invention relates to a method for preparing thioacetamides and dithiooxalodiamides having respectively the general formulas:

and

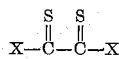

in which X is a monovalent heterocyclic radical of a member of the class consisting of morpholine, thiamorpholine, pyrrolidine, and piperidine, said heterocyclic radical being joined to the dithiooxalo or thioaceto portion of the molecules through its imino-nitrogen atom.

The compounds are prepared according to this invention by reacting, under anhydrous conditions at a temperature from 80° C. to 300° C., (a) acetylene, (b) sulfur, and (c) a heterocyclic imine from the class consisting of morpholine, thiamorpholine, piperidine, and pyrrolidine. The reaction which is involved is best illustrated by the following typical equations which show the reactions of sulfur, acetylene, and morpholine:

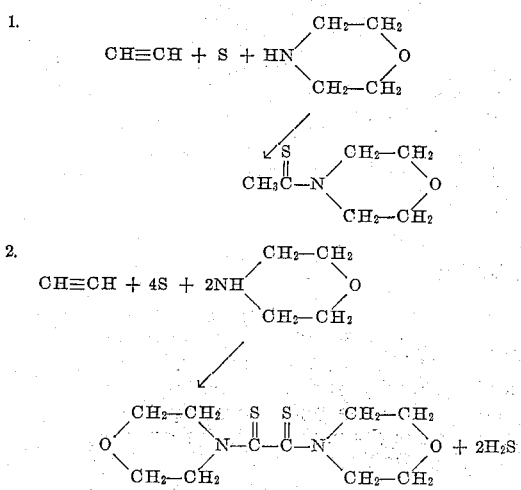

The other three cyclic imines react in a similar manner, and the products thereof have the following formulas:

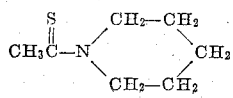

and

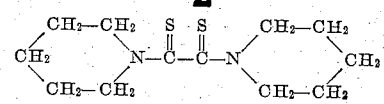

from piperidine,

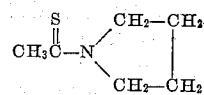

and

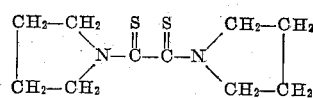

from pyrrolidine, and

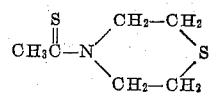

and

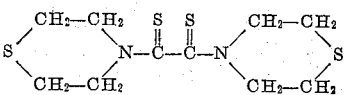

from thiamorpholine.

The reaction takes place at temperatures from 80° C. to 300° C., although those from 100° C. to 150° C. are much preferred. Solvents such as dioxane or pyridine may be present, but in any case the reaction is conducted under substantially anhydrous conditions. Atmospheric, subatmospheric or superatmospheric pressures may be employed. It is preferred, however, to carry out this process at atmospheric pressure because of the difficulty of maintaining sufficiently high temperatures at low pressures and because of the well known hazards of using acetylene under pressure.

The products of this invention are useful as intermediates for chemical syntheses and as insecticides and anti-oxidants.

While the three components react in the ratios set forth in the typical equations above, it is desirable to employ an excess of the sulfur and imine, as is evident from the fol'owing example which illustrates the process of this invention.

Example 1

A mixture of 55 grams of sulfur and 400 cc. of morpholine was placed in a four-necked flask equipped with mechanical stirrer, reflux condenser, thermometer, and gas inlet tube. This mixture was stirred rapidly and heated to refluxing temperature and then 0.125 mole of acetylene was passed into the mixture over a period of one hour. Stirring and heating at refluxing temperature was continued for an additional period of three and one-half hours. The product was then placed in a vacuum evaporator and the excess morpholine was stripped off. The tarry residue was then taken up in 400 cc. of a mixture of equal parts of water and methanol which dissolved the tarry material and held the solid matter. The latter was filtered. The filtrate (A) was treated later as described in the next paragraph. The residue was washed with 100 cc. of a mixture of equal parts of water and methanol. The residue was then dispersed in 500 cc. of a 0.2 M solution of sodium sulfide and heated to 80° C. for one-half hour during which time the unreacted sulfur dissolved. This solution was filtered hot and the residue was washed with water and finally dried. The product weighed 17.4 grams and was equivalent to a yield of 53.5% based on the acetylene. The product, dithiooxalodimorpholide, after recrystallization from ethanol, melted at 263°–265° C. and did not depress the melting point of an authentic sample of dithiooxalodimorpholide when mixed therewith.

The tarry filtrate (A) obtained above was placed in a modified Claisen flask, stripped of solvent, and distilled at a pressure of 3 mm. An orange liquid which distilled at 130°–150° C. solidified in the receiver. It was dissolved in 100 cc. of hot ethanol and the solution was evaporated to one-third of its original volume and cooled. Eight and two-tenths grams of yellow, needle-like crystals was obtained, which amount was equivalent to about a 45% yield based on the acetylene. When recrystallized from alcohol, the crystals melted at 88.8° to 90.3° C. and did not depress the melting point of an authentic sample of thioacetomorpholide when mixed therewith.

In a similar way the derivatives of thiamorpholine, pyrrolidine, and piperidine are prepared.

Ordinarily, both the thioaceto and the dithiooxalo derivatives of the cyclic imines are obtained. Under the conditions of Example 1 about equimolar amounts of each were obtained. It has been noted, however, that as the reaction continues a preponderance of the dithiooxalo derivative is produced. In fact, as the following example illustrates, the dithiooxalo compounds can be made by reacting sulfur, the cyclic imine, and the corresponding thioacetamide.

*Example 2*

A mixture of 14.5 grams of thioacetomorpholide (0.1 mole), 34.8 grams of morpholine (0.4 mole), and 8.0 grams of sulfur (0.25 mole) was placed in a three-necked flask equipped with thermometer, stirrer, and reflux condenser. The mixture was maintained at refluxing temperature for seven hours, during which time hydrogen sulfide was liberated. Care was exercised to prevent blocking of the condenser with crystalline morpholine sulfide. The mixture was then cooled and dissolved in 100 cc. of chloroform; and this solution was washed first with water, then with dilute hydrochloric acid and again with water. The chloroform was stripped off and the residue was taken up in 100 cc. of methanol. The insoluble, crystalline material was filtered off and dried. It weighed 11.5 grams. After recrystallization from alcohol, its melting point was 265°–267° C. and it did not depress the melting point of an authentic sample of dithiooxalodimorpholide when mixed therewith.

In a similar way the thioaceto derivatives of thiamorpholine, pyrrolidine, and piperidine are converted to the corresponding dithiooxalo derivatives.

I claim:

1. The process of preparing a mixture of thioacetamides and dithiooxalodiamides having respectively the formulas

and

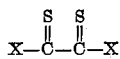

in which X in each occurrence is the same monovalent heterocyclic radical of a member of the class consisting of morpholine, thiamorpholine, piperidine and pyrrolidine, and in which the radicals represented by X are joined to the carbon atoms of the thioamides through their imino-nitrogen atoms, which process comprises heating under anhydrous conditions at a temperature from 80° C. to 300° C. a mixture of acetylene, sulfur and a member of the above class, in which mixture the sulfur and the member of said class are both present in amounts greater than are stoichiometrically equivalent to the amount of acetylene present, and thereafter separating from the reaction mixture the resultant thioacetamide and dithiooxalodiamide.

2. The process of preparing a mixture of thioacetamides and dithiooxalodiamides having respectively the formulas

and

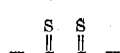

in which X in each occurrence is the same monovalent heterocyclic radical of a member of the class consisting of morpholine, thiamorpholine, piperidine and pyrrolidine, and in which the radicals represented by X are joined to the carbon atoms of the thioamides through their imino-nitrogen atoms, which process comprises heating under anhydrous conditions at a temperature from 100° C. to 150° C. a mixture of acetylene, sulfur and a member of the above class, in which mixture the sulfur and the member of said class are both present in amounts greater than are stoichiometrically equivalent to the amount of acetylene present, and thereafter separating from the reaction mixture the resultant thioacetamide and dithiooxalodiamide.

3. The process of preparing a mixture of thioacetomorpholide and dithiooxalodimorpholide which comprises heating under anhydrous conditions at a temperature from 100° C. to 150° C. a mixture of acetylene, sulfur and morpholine in which mixture the sulfur and morpholine are both present in amounts greater than are stoichiometrically equivalent to the amount of acetylene present, and thereafter separating from the reaction mixture the resultant thioacetomorpholide and dithiooxalodimorpholide.

4. The process of preparing a mixture of thioacetopiperidide and dithiooxalodipiperidide which comprises heating under anhydrous conditions at a temperature from 100° C. to 150° C. a mixture of acetylene, sulfur and piperidine in which mixture the sulfur and piperidine are both present in amounts greater than are stoichiometrically equivalent to the amount of acetylene present, and thereafter separating from the reaction mixture the resultant thioacetopiperdide and dithiooxalodipiperidide.

5. The process of preparing a mixture of thioacetopyrrolidide and dithiooxalodipyrrolidide which comprises heating under anhydrous conditions at a temperature from 100° C. to 150° C. a mixture of acetylene, sulfur and pyrrolidine in which mixture the sulfur and pyrrolidine are both present in amounts greater than are stoichiometrically equivalent to the amount of acetylene present, and thereafter separating from the reaction mixture the resultant thioacetopyrrolidide and dithiooxalodipyrrolidide.

CHARLES L. LEVESQUE.

REFERENCES CITED

The following references are of record in the file of this patent:

UNITED STATES PATENTS

| Number | Name | Date |
|---|---|---|
| 2,105,845 | Reppe et al. | Jan. 18, 1938 |
| 2,358,925 | Haller et al. | Sept. 24, 1944 |

FOREIGN PATENTS

| Number | Country | Date |
|---|---|---|
| 405,675 | Germany | Nov. 4, 1924 |

OTHER REFERENCES

King et al., Jour. Amer. Chem. Soc., vol. 68 (1946), pp. 1369–1373.

De Tar et al., Jour. Amer. Chem. Soc., vol. 68 (1946), pp. 2025–2029.

Carmack et al., Jour. Amer. Chem. Soc., vol 68 (1946), pp. 2029–2033.

McMillan et al., Jour. Chem. Soc., vol. 69 (1947), pp. 1207–1208.

Adams Organic Reactions, vol. III (Jan. 1947), John Wiley and Sons Inc., N. Y., pages 88, 90, 93 and 99–103 (complete article pages 83–103).